July 15, 1947.   A. HENDERSON   2,423,936
PRECAST REINFORCED CONCRETE MEMBER
Filed June 29, 1945
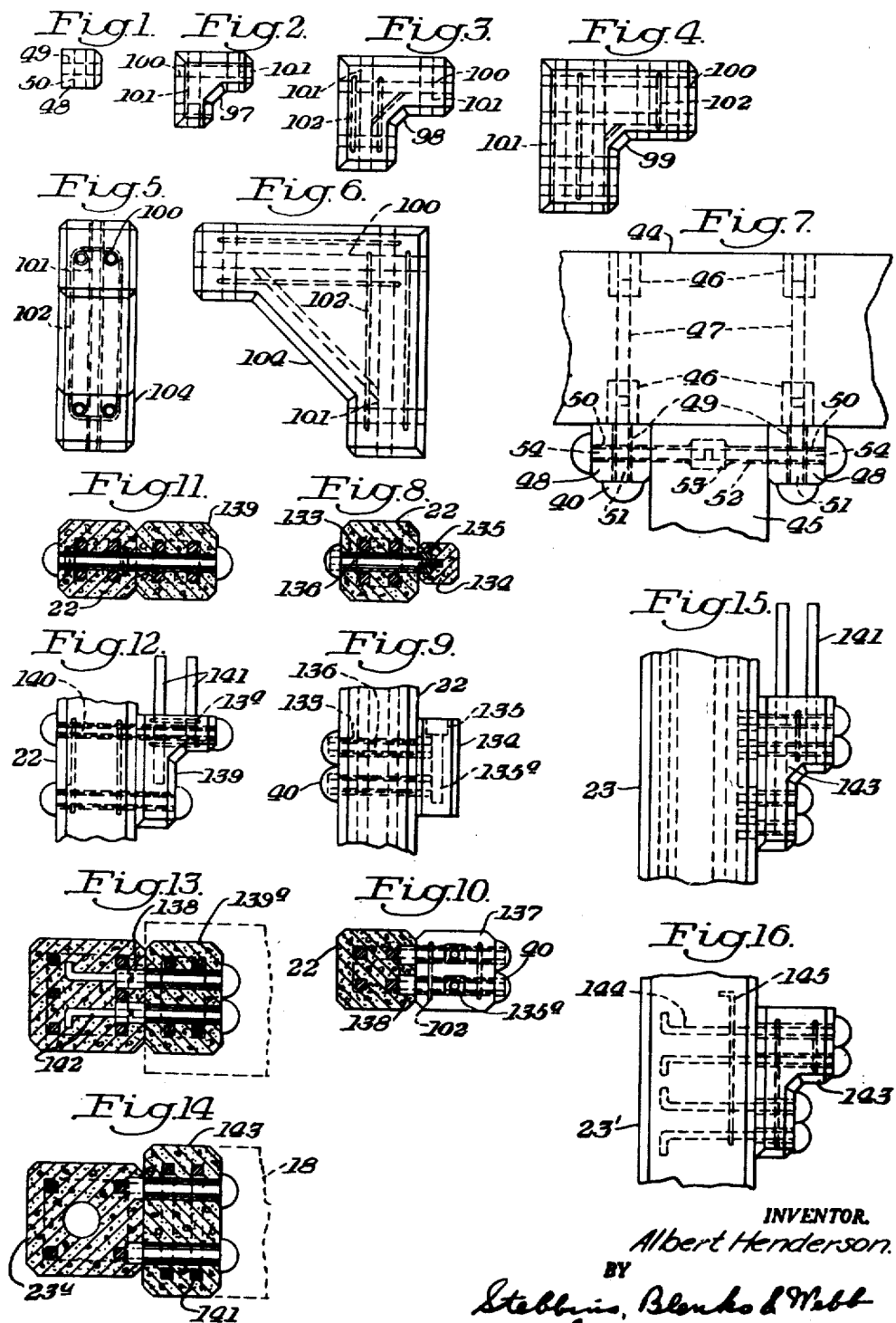
INVENTOR.
Albert Henderson.
BY
Stebbins, Blenko & Webb
his attorneys Patented July 15, 1947

2,423,936

UNITED STATES PATENT OFFICE 2,423,936

PRECAST REINFORCED CONCRETE MEMBER

Albert Henderson, Edgewood, Pa., assignor to William P. Witherow, Pittsburgh, Pa.

Original application May 11, 1945, Serial No. 593,220. Divided and this application June 29, 1945, Serial No. 602,327

6 Claims. (Cl. 72—108)

This invention relates to precast structural members of reinforced concrete and, in particular, to a simplified system of such members whereby many types of structures may be erected using a relatively small number of standard shapes. Specifically, I provide a novel precast concrete bracket for connecting girders to columns, beams to girders, and the like.

In order to make a system of precast structural members practical, satisfactory forms of connections between the various members are necessary. The lack of such connections is probably the reason for the relatively limited use of precast structural members heretofore. To meet this requirement, I embed lengths of metal pipe in certain of the members such as girders, beams, joists, brackets and the like. The pipe lengths are welded to reinforcing rods embedded in the members, thus imparting the necessary rigidity to the connections. By thus welding the reinforcing rods and anchor rods to the pipe lengths, instead of relying on some other form of tie, such as looping the rods around the pipe lengths, I obtain an extremely rigid bond between the pipe lengths and the concrete and avoid any danger of cracking of the concrete adjacent the pipe lengths which would result in breaking the bond therebetween.

I preferably employ pipe of a convenient size, such as 1½", for embedding in the members to provide the necessary connections. The pipe lengths are preferably positioned in the members so that their centers are substantially 2½" from the nearest surface of the member, thus providing an adequate thickness of concrete to protect the pipe lengths from fire and corrosion.

The brackets are made in several widths, each of which is an integral multiple of the width of the narrowest size. The member of the narrowest width has connections composed of one pipe length embedded therein. The members of greater widths have two pipe lengths embedded therein for each connection. The center-to-center spacing between the pipe lengths of the members other than the smallest, increases by a distance equal to the width of the latter. For example, if the width of the narrowest member of one type is 4", the next larger sizes are 8", 12" and 16". The 4" wide member has one pipe length embedded therein for each connection. The remaining members have two pipe lengths embedded therein for each connection. The center-to-center spacing of the pipe lengths in the 8" wide member is 3", in the 12" wide member 7" and in the 16" wide member 11".

The embedded pipe lengths permit adjacent members to be secured together by means of dowels embedded in one member and extending through a pipe length in the other. In some cases pipe lengths embedded in two or more members are disposed in alinement and a common bolt therethrough secures them together. As a further alternative, a nut may be embedded in one member and a bolt inserted through a pipe length in another member and threaded into the nut.

The brackets having widths of 4", 8", 12" and 16" are made in various depths differing by 2". This permits the use of metal stirrups of the same width for a given width of brackets. The stirrups used for the size of members next larger than the minimum width can be also applied to members of larger widths. For example, two stirrups may be used in the members 12" wide and three in the members 16" wide. I also use the stirrups to tie together the spaced pipe lengths in some shapes, such as brackets, splice plates, etc.

The widths of the various brackets (4", 8", 12" and 16") are integral multiples of the width of the smallest similar member and the widths and depths of the various members are appropriately related. Similarly, the depths of the various members vary by a predetermined increment.

In all the brackets, the centers of the longitudinal reinforcing rods nearest the surfaces of the members are spaced substantially the same distance therefrom, 2½". Where the connections involve bolts, the heads thereof or the nuts threaded thereon may be embedded below the surface of the members and then mortared over for protection against fire and corrosion. As an alternative, a precast concrete cover may be applied to the nut or bolt heads for protection. This is desirable when erection proceeds during cold weather to eliminate the freezing of mortar applied in the field.

Further details, novel features and advantages of my invention will become apparent during the following complete description which refers to the accompanying drawings. In the drawings, Figures 1 through 4 are side elevations of precast brackets showing a range of graduated sizes;

Figure 5 is an end view of a different form of bracket;

Figure 6 is a side elevation of the bracket shown in Figure 5;

Figure 7 is a partial elevation of a connection between a column and girder including rectangular brackets;

Figures 8 and 9 are a sectional view and elevation showing a column having a bracket member secured thereto;

Figure 10 is a view similar to Figure 8 showing a different form of bracket;

Figures 11 and 12 are a sectional view and elevation of a column having a further modified form of bracket;

Figure 13 is a section through a column having a different form of bracket connection;

Figures 14 and 15 are a sectional view and elevation of a column having a still further form of bracket connection; and Figure 16 is an elevation of further modified bracket connection.

Figures 1 through 4 show precast brackets 48, 97, 98 and 99. The bracket 48 has already been described in connection with Figure 26. The bracket 96 is preferably a block 4" x 4", of any desired length, with pipe lengths 49 and 50 embedded therein. The brackets 97, 98 and 99 are L-shaped having pipe lengths 100 and 101 embedded therein at right angles to each other. The bracket 97 is preferably 8" wide and 8" high. The bracket 98 is similarly 12" x 12" and the bracket 99, 16" x 16". Their remaining dimension, as in the case of the bracket 48, varies by 2" increments depending on the width of the member to which they are attached. The embedded pipe lengths, of course, accommodate bolts for securing to the brackets the members to be connected. In plan, the brackets are preferably 4" x 4", 8" x 8", 12" x 12", and 16" x 16" and the embedded pipe lengths are positioned therein to match the spacing of the reinforcing rods of other members to which the bracket is to be secured. The pipe lengths 100 and 101 may be welded together and may also have stirrups 102 welded thereto. The brackets 97, 98 and 99 are shown with legs of equal lengths but the lengths of the legs may vary independently by 2" increments to match the various sizes of the other members. The embedded pipe lengths may also be positioned to come between the longitudinal reinforcing rods of the members to which the brackets are attached. Nuts may be welded to the pipes for receiving the tie bolts. The spacings between centers of the pipe lengths are 3" and 7", or 7" and 11" or 3" and 11".

Figures 5 and 6 show a gusset-plate bracket 104 generally similar to the bracket 99 except somewhat larger. The brackets 104 may be made in various thicknesses differing by 2" increments and their width and depth vary similarly. Embedded pipe lengths are disposed in substantially the same manner as in the bracket 99. It will be understood that the additional length of either leg of any of the brackets may be provided with extra bolt holes to carry added shear load.

Figure 7 shows a connection including brackets joining a member 44 and a member 45, either of which may be the supporting member and the other the supported member. Member 44 has double-length nuts 46 embedded therein on opposite faces connected by studs 47. Brackets 48 are provided as described above and are secured to the member 44 by bolts 51. The member 45 has pipe lengths 52 and a double-length nut 53 welded thereto embedded therein adapted to receive bolts 54 inserted through the pipe lengths 50 in the brackets. The member 44 may be a girder and the member 45 a beam supported by the girder or a column supporting the girder. The location of nut 53 centrally of member 45 and the welding thereof to the pipe lengths 52 permits the bolts 54 to develop full shear strength since the threaded portion is spaced from the shear line. This avoids the reduction in area of the bolts by the threading thereof which would exist if the bolts 54 were threaded into bolts embedded in the side faces of the member 45. This is of particular importance where only one member is attached to a support and the securing bolts cannot go all the way through.

Figures 8 through 16 show the connections between the brackets and the columns on which they are supported. Figures 8 and 9 show a column 22 having pipe lengths 133 extending therethrough between the reinforcing rods thereof and welded thereto. The bracket 134 has nuts 135 welded to the end and one side of a reinforcing bar 135a embedded therein. Bolts 136 inserted through the pipe lengths are threaded into these nuts, thus firmly anchoring the bracket to the column.

Figure 10 shows a larger bracket 137 secured to a column 22 by means of bolts inserted through pipe lengths embedded in the bracket and threaded into nuts 138 welded to the column reinforcing bars. Nuts 135a embedded in the bracket are welded to the pipe lengths embedded therein. These nuts, being in alinement with the column reinforcing bars, are adapted to receive bolts inserted through pipe lengths embedded in the end of a beam.

Figures 11 and 12 show a bracket 139 secured to a column 22 by bolts 140 inserted through alined pipe lengths embedded in the two members. Stirrups extend around the pipe lengths 1 to give ample bond with the concrete. The bracket 139 has dowels 141 extending upwardly therefrom adapted to enter the pipe lengths embedded in the ends of a beam or girder and spaced appropriately for that purpose.

Figure 13 shows a column with reinforcing rods and a bracket 139a similar to that shown at 139. The column has double-length nuts 138 therein welded to the reinforcing rods and having embedded anchor rods 142 threaded thereinto. Bolts inserted through the pipe lengths embedded in the bracket and welded to the reinforcing rods therein are threaded into nuts. The bracket 139a has dowels similar to those of the bracket 139.

Figures 14 and 15 show a column 23a having a bracket 143 secured thereto in the same manner as the bracket 127 is secured to the bracket 22 in Figure 10. The pipe lengths embedded in the bracket are welded to the reinforcing rods thereof. The bracket 143, being 12" wide, is adapted to support a beam of the same width and the dowels 141 are adapted to extend into the pipe lengths embedded in the beam. The column 23a in Figure 14 has a central longitudinal void to provide a duct for air or pipe lines.

Figure 16 shows a column 23' having anchor bolts 144 embedded therein whereby a bracket 143 may be secured thereto by turning nuts on the ends of the bolts extending through the bracket when disposed in position on the column. A metal strap 145 welded to the anchor bolts transmits the shear load on the bracket to the column by virtue of the bond between it and the column concrete.

This is a division of my application Serial No. 593,220, now Patent 2,396,045.

I claim:

1. A building construction comprising a plurality of precast reinforced concrete members including a support member having a tie extending laterally therefrom, a bracket member hanging on said tie and abutting one side of said support member, and a beam member transversely disposed to said support member and resting on said bracket member, said beam member when loaded causing bending action on the top and side of said bracket, and a tension reinforcing member embedded in the upper portion of said bracket member parallel to the said beam member, said reinforcing member comprising a metal member having a bore therein enclosing said tie extending from said support member.

2. A building construction comprising a plurality of precast reinforced concrete members as defined by claim 1 characterized by a second tension reinforcing member embedded in said bracket member adjacent the side abutting the support member and parallel to said support member, said second reinforcing member being disposed transversely to said first-mentioned reinforcing member.

3. A building construction comprising a plurality of precast reinforced concrete members as defined by claim 2 characterized by said second tension reinforcing member being welded to said first-mentioned tension reinforcing member.

4. A building construction comprising a plurality of precast reinforced concrete members as defined by claim 2 characterized by said second tension reinforcing member having a bore therein enclosing a tie extending into said beam member.

5. A precast reinforced concrete bracket having two adjacent bearing sides at right angles to each other, a tension reinforcing member embedded therein adjacent to and parallel to each of said bearing sides, one of said tension reinforcing members comprising a metal member having a bore therein.

6. A precast reinforced concrete bracket as defined by claim 5 characterized by said tension reinforcing members being welded together.

ALBERT HENDERSON.

REFERENCES CITED

The following references are of record in the file of this patent:

UNITED STATES PATENTS

| Number | Name | Date |
|---|---|---|
| 1,083,876 | Craig | Jan. 6, 1914 |
| 1,259,698 | Wilson | Mar. 19, 1918 |
| 1,407,277 | Ingberg | Feb. 21, 1922 |
| 1,990,157 | Young | Feb. 5, 1935 |
| 2,137,009 | Stromberg | Nov. 5, 1938 |
| 2,128,375 | Millard | Aug. 30, 1938 |

FOREIGN PATENTS

| Number | Country | Date |
|---|---|---|
| 422,765 | Great Britain | Jan. 17, 1935 |
| 510,055 | France | 1920 |

Certificate of Correction

Patent No. 2,423,936.   July 15, 1947.

ALBERT HENDERSON

It is hereby certified that errors appear in the printed specification of the above numbered patent requiring correction as follows: Column 2, line 11, after the period insert the following sentence: *In any case, the embedded pipe length serves as an essential element of the combination.*; line 26 for "similar member" read *bracket*; lines 27 and 29 for "members" read *brackets*; column 3, lines 19 and 20, strike out "The bracket 48 has already been described in connection with Figure 26."; column 4, line 36, after the word "lengths" strike out the numeral "1"; same column, line 71, insert the following paragraph—

*Although I have illustrated several preferred embodiments with modifications, it will be apparent that changes in the details disclosed herein may be made without departing from the spirit of the invention or the scope of the appended claims.* and that the said Letters Patent should be read with these corrections therein that the same may conform to the record of the case in the Patent Office.

Signed and sealed this 23rd day of September, A. D. 1947.

[SEAL]

THOMAS F. MURPHY,
*Assistant Commissioner of Patents.* including a support member having a tie extending laterally therefrom, a bracket member hanging on said tie and abutting one side of said support member, and a beam member transversely disposed to said support member and resting on said bracket member, said beam member when loaded causing bending action on the top and side of said bracket, and a tension reinforcing member embedded in the upper portion of said bracket member parallel to the said beam member, said reinforcing member comprising a metal member having a bore therein enclosing said tie extending from said support member.

2. A building construction comprising a plurality of precast reinforced concrete members as defined by claim 1 characterized by a second tension reinforcing member embedded in said bracket member adjacent the side abutting the support member and parallel to said support member, said second reinforcing member being disposed transversely to said first-mentioned reinforcing member.

3. A building construction comprising a plurality of precast reinforced concrete members as defined by claim 2 characterized by said second tension reinforcing member being welded to said first-mentioned tension reinforcing member.

4. A building construction comprising a plurality of precast reinforced concrete members as defined by claim 2 characterized by said second tension reinforcing member having a bore therein enclosing a tie extending into said beam member.

5. A precast reinforced concrete bracket having two adjacent bearing sides at right angles to each other, a tension reinforcing member embedded therein adjacent to and parallel to each of said bearing sides, one of said tension reinforcing members comprising a metal member having a bore therein.

6. A precast reinforced concrete bracket as defined by claim 5 characterized by said tension reinforcing members being welded together.

ALBERT HENDERSON.

REFERENCES CITED

The following references are of record in the file of this patent:

UNITED STATES PATENTS

| Number | Name | Date |
|---|---|---|
| 1,083,876 | Craig | Jan. 6, 1914 |
| 1,259,698 | Wilson | Mar. 19, 1918 |
| 1,407,277 | Ingberg | Feb. 21, 1922 |
| 1,990,157 | Young | Feb. 5, 1935 |
| 2,137,009 | Stromberg | Nov. 5, 1938 |
| 2,128,375 | Millard | Aug. 30, 1938 |

FOREIGN PATENTS

| Number | Country | Date |
|---|---|---|
| 422,765 | Great Britain | Jan. 17, 1935 |
| 510,055 | France | 1920 |

Certificate of Correction

Patent No. 2,423,936.         July 15, 1947.

ALBERT HENDERSON

It is hereby certified that errors appear in the printed specification of the above numbered patent requiring correction as follows: Column 2, line 11, after the period insert the following sentence: *In any case, the embedded pipe length serves as an essential element of the combination.*; line 26 for "similar member" read *bracket*; lines 27 and 29 for "members" read *brackets*; column 3, lines 19 and 20, strike out "The bracket 48 has already been described in connection with Figure 26."; column 4, line 36, after the word "lengths" strike out the numeral "1"; same column, line 71, insert the following paragraph—

*Although I have illustrated several preferred embodiments with modifications, it will be apparent that changes in the details disclosed herein may be made without departing from the spirit of the invention or the scope of the appended claims.* and that the said Letters Patent should be read with these corrections therein that the same may conform to the record of the case in the Patent Office.

Signed and sealed this 23rd day of September, A. D. 1947.

[SEAL]

THOMAS F. MURPHY,
*Assistant Commissioner of Patents.*